US008309205B2

(12) United States Patent
Nelissen et al.

(10) Patent No.: US 8,309,205 B2
(45) Date of Patent: Nov. 13, 2012

(54) SINGLE CRYSTAL DIAMOND ELEMENTS HAVING CONVEX SURFACES AND METHODS OF ITS FABRICATION

(75) Inventors: Wilhelmus Gerarda Maria Nelissen, Venray (NL); Herman Philip Godfried, Amsterdam (NL); Evert Pieter Houwman, Linden (NL); Paulus Adrianus Cornelis Kriele, Mill (NL); Johannes Cornelis Lamers, Duiven (NL); Gerrit Jan Pels, Arnhem (NL); Bartholomeus Mathias Van Oerle, Nijmegen (NL); Paulus Geradus Hendricus Maria Spaay, Wijchen (NL); Mark Robin McClymont, Wokingham (GB); Christopher John Howard Wort, Wantage (GB); Geoffrey Alan Scarsbrook, Ascot (GB)

(73) Assignee: Element Six Limited, Ballasalla (GB)

( * ) Notice: Subject to any disclaimer, the term of this patent is extended or adjusted under 35 U.S.C. 154(b) by 1057 days.

(21) Appl. No.: 11/995,067

(22) PCT Filed: Jul. 7, 2006

(86) PCT No.: PCT/GB2006/050195
§ 371 (c)(1),
(2), (4) Date: Sep. 11, 2008

(87) PCT Pub. No.: WO2007/007126
PCT Pub. Date: Jan. 18, 2007

(65) Prior Publication Data
US 2009/0022951 A1 Jan. 22, 2009

(30) Foreign Application Priority Data
Jul. 8, 2005 (GB) .................................. 0513932.4

(51) Int. Cl.
*B32B 3/00* (2006.01)

(52) U.S. Cl. ......................................... 428/156; 428/172
(58) Field of Classification Search .................. 428/156, 428/172; 407/119
See application file for complete search history.

(56) References Cited

U.S. PATENT DOCUMENTS 6,145,608 A * 11/2000 Lund et al. ..................... 175/428
2004/0047270 A1 3/2004 Takeda et al.

FOREIGN PATENT DOCUMENTS

| JP | 4-154635 | 5/1992 |
|----|----------|--------|
| JP | 7-40336 | 2/1995 |
| JP | 2004-344957 | 12/2004 |
| WO | 99 21060 | 4/1999 |
| WO | WO 00/37208 | 6/2000 |
| WO | 01 87176 | 11/2001 |
| WO | WO 2004/046427 A1 | 6/2004 |

OTHER PUBLICATIONS

Gu, E. "Reflection/Transmission Confocal Microscopy Characterization of Single-Crystal Diamond Microlens Arrays." Applied Physics Letters, AIP, American Institute of Physics, Melville, NY, US. vol. 84 No. 15, pp. 2754-2756, 2004. XP012061055 ISSN: 0003-6951.
Japanese Office Action mailed Oct. 3, 2011, in Patent Application No. 2008-520011 (English translation only).
V.S. Pavelyev, et al., "Diamond Diffractive Optical Elements for Infrared Laser Beam Control", Proceedings of SPIE, vol. 5456, XP040186511, Sep. 1, 2004, pp. 209-219.
Andreas Ostendorf "Automatic control of a thermal based polishing process for aspherical optics" Proceedings of SPIE, vol. 5252, XP040252889, Feb. 26, 2004, pp. 69-79.
S.M. Pimenov, et al., "Laser polishing of diamond plates" Applied Physics A, vol. 69, XP002552039, pp. 81-88, 1999.

* cited by examiner

*Primary Examiner* — Catherine A Simone
(74) *Attorney, Agent, or Firm* — Oblon, Spivak, McClelland, Maier & Neustadt, L.L.P.

(57) ABSTRACT

A single crystal diamond element having a convex surface is disclosed, the convex surface including a spherical segment for which the maximum peak to valley deviation from a perfect spherical surface is less than about 5 μm. Alternatively or in addition, the RMS deviation from a perfect spherical surface may be less than about 500 nm, or the RMS roughness less than about 30 nm. A single crystal diamond element with a radius of curvature less than about 20 mm is also disclosed. In one aspect a single crystal diamond element having a conical half-angle greater than about 10° is described. The invention also provides a method for forming a rotationally symmetrical surface on a single crystal diamond element, comprising rotating the element about a first axis, applying a laser beam to the element in a direction perpendicular to the first axis, and translating the laser beam in two dimensions in a plane perpendicular to the direction of the beam. If the two-dimensional path follows the arc of a circle a spherical surface may be formed. The invention also provides improving a spherical surface on a single crystal diamond element by pressing a rapidly rotating cup onto a slowly rotating element. The element may be a lens, in particular a solid immersion lens.

22 Claims, 3 Drawing Sheets

SINGLE CRYSTAL DIAMOND ELEMENTS HAVING CONVEX SURFACES AND METHODS OF ITS FABRICATION

CROSS-REFERENCE TO RELATED APPLICATIONS

This application is a 371 of PCT/GB06/50195 filed Jul. 7, 2006 and claims the benefit of GB0513932.4 filed Jul. 8, 2005.

FIELD OF THE INVENTION

The present invention relates to the forming of convex surfaces on single crystal diamond elements. In particular, although not exclusively, the invention relates to polishing spherical surfaces on diamond elements for use as lenses, such as solid immersion lenses to be used in information recording and/or reproducing apparatus and in optical pickup devices. Such lenses may also be used in microscopy and lithography and in probes such as endoscopic probes used in diagnostic and minimally invasive surgical procedures in medical applications. The present invention also relates to the polishing of diamond spherical surfaces for use as metrology tips. The present invention further relates to the polishing of diamond spherical surfaces for use as references for measurement of hole diameters or calibration of measurement instruments such as calipers and for use as reference spacers and references that define a plane.

BACKGROUND TO THE INVENTION

Lenses have for centuries been used in imaging systems, focusing optics etc. Usually they are made from a material that is transparent in the wavelength range they are to be used, and they have polished surfaces according to some prescribed shape. Most lenses are formed in the shape of a disc with polished surfaces above and below. Typically, one or both of the polished surfaces take the form of part of a sphere with a radius of curvature equal to or larger than the radius of the disc. If only one of the surfaces is spherical, the opposite surface is usually flat. Common materials used to manufacture lenses are glasses, crystals transparent in the visible such as sapphire, and infrared transparent materials such as silicon, zinc selenide, zinc sulphide and germanium.

There are certain applications which require particular material properties of the lens. Any lens which is used in the manipulation of high intensity laser light needs to have a high optical damage threshold. A high thermal conductivity is also beneficial as this minimises the temperature variation within the lens, thereby reducing distortion. In certain applications it is important that the material used simultaneously displays a high transmission and a high refractive index at the wavelength of light to be focussed by the lens.

Diamond displays material properties useful in lenses for such applications, and accordingly the ability to manufacture a diamond lens to a high specification is desirable. Lenses formed from diamond have been made in the past but are rare due to the difficulties involved in polishing such lenses to provide the necessary optical properties.

A type of lens which would particularly benefit from being formed of diamond is a Solid Immersion Lens (SIL) of the type used in optical pickup devices for reading information from digital media such as DVDs. US-A-2004/0047270 describes an information recording and/or reproducing apparatus which aims to improve recording and reproduction capacity on an optical disc. The apparatus includes a hemispherical or super-hemispherical SIL as part of a converging lens unit (a "super-hemispherical" surface refers to the shape of the larger portion of a sphere divided by a plane not including the centre of the sphere). The SIL must be formed of a highly refractive and transmissive material, and diamond is suggested as a potential material from which such a SIL might be formed. However, no information is provided as to how a diamond SIL might be produced.

As described in Optical Near-Field Recording, by J. Tominaga and T. Nakano, Springer-Verlag, Berlin Heidelberg, 2005, ISBN 3-540-22128-X, a SIL should have a shape which is hemispherical or super-hemispherical with a polished flat side opposite the spherical surface. Its thickness, t, is determined to be either equal to the radius, r, of the SIL in the case of the hemispherical SIL $$t = r \quad (1)$$

or for a super-hemispherical SIL $$t = r(1 + 1/n) \quad (2)$$

where n is the index of refraction of the material from which the SIL is made at the wavelength of radiation used. Other designs using SILs with thickness slightly modified from the values given in Equations 1 and 2 have also been considered. In such cases, a DVD may include a layer carrying information bits buried under a relatively thick (several micrometer) top layer. In order to get diffraction-limited performance of the overall optical system, the thickness of the SIL must be reduced, and the focusing and spherical aberration of the optical system preceding the SIL adjusted, to compensate for the defocus and the spherical aberration of this top layer.

A SIL used for such an application needs to conform to very high demands on the accuracy of the spherical surface in terms of deviations from an ideal spherical surface and the roughness of the polished surface. In addition the thickness of the SIL needs to be controlled to fractions of a micrometer. The reason for these stringent requirements is the need for an optical system with a so-called diffraction limited spot size in order to obtain the highest possible storage density. To date, it has not been possible to polish a diamond lens having a sufficiently small radius of curvature, or with the required optical properties, for use as a SIL.

Lens polishing is traditionally achieved using one of two distinct principles:

1) Single point turning: In this fairly recent method lenses can be formed of soft materials such as plastics, or infrared transparent materials such as germanium or zinc selenide. Material is removed with a very sharp, very hard turning tool, almost always a diamond tip. By prescribing the motion of the tool tip relative to the workpiece, a surface can be produced on the workpiece with a prescribed shape. This surface need not be spherical but can have an aspheric shape, such as a paraboloid or ellipsoid shape. The accuracy of the shape is mainly determined by the accuracy and stability of the stages on which the turning tool is mounted. Air-bearings are usually used to insulate the work piece and turning tool from vibrations in the environment. This system is not suitable for use in shaping diamond surfaces, because the inevitable wear of the turning tool is much larger than the removal rate of material from the workpiece due to the large ratio of the surface area of the workpiece relative to the area of the tool tip.

2) The more traditional polishing technique for glass optics relies on a polishing powder filled pitch or felt cup or wheel which rotates around its axis. The glass workpiece is pressed onto the cup and is polished by a random motion relative to the cup. Traditional materials used as powders in such polishing include corundum, silicon carbide and diamond. Due to the random motion of the cup or wheel relative to the workpiece, the surface of the workpiece will eventually gain a spherical shape, and very accurate lenses can be produced in this manner. Diamond is traditionally polished using a modified version of this method, but there are limits to the lenses which can be produced in this way, as discussed in more detail below.

It is well known that diamond is the hardest material available in nature. Diamond is therefore traditionally polished using rapidly rotating cast-iron or bronze wheels or "scaifes" impregnated with a fine diamond powder. Scaife technology enables the production of finely polished diamond surfaces. Unlike glass, which is an isotropic amorphous material (having the short range order of a liquid but no long range order), diamond is a cubic crystal. This means that in certain planes relative to the crystal axes it is relatively easy to polish diamond, while in other directions polishing is almost impossible by traditional methods. In particular, the "soft" (easily polished) planes coincide with (for example) the so-called 2-point and 4-point planes, known in crystallographic terminology as {110} and {100} planes, while the so-called 3-point planes (the {111} planes) coincide with the "hard" or very difficult to polish planes.

More recent methods involve the use of polishing wheels comprising resin polymer filled with diamond powder and mounted on metal carrier wheels or cups, and this enables polishing of diamond in arbitrary directions. However, the effects of varying hardness in different directions are still clearly present, and the polishing speed therefore still varies with the orientation of the crystal. For most traditional diamond polishing only flat planes are polished, in which case the speed of polishing is uniform over the area of the plane, resulting in uniform removal of material.

When polishing a spherical surface, as required by a lens, the polishing wheel or cup must remove material from the lens over a range of orientations of the polishing wheel with respect to the crystal axes. Thus, even when using a resin-bond polishing wheel or cup, the removal rate will be non-uniform across the surface. This results in a surface having large deviations from the intended ideal spherical shape, especially if a substantial fraction of a hemisphere is required.

Diamond lenses have been produced both from single-crystalline and from poly-crystalline material. Where poly-crystalline material fabricated by Chemical Vapour Deposition (CVD) is used, it is possible to grow the diamond onto a pre-shaped surface. The as-grown diamond discs are then polished flat using standard techniques of resin-bond wheel polishing, or can be given a curved finish with a curved polishing wheel or cup. However this technique cannot be used for natural single-crystalline diamond, or for synthetic crystals grown using the High Pressure and High Temperature (HPHT) technique. Furthermore, it is also not appropriate for CVD-grown single-crystalline material. This is because single crystal CVD diamonds are grown on a substrate which is itself formed from diamond, for which pre-shaping would be just as difficult as for the CVD-grown material to be shaped. In addition, removing the CVD-grown diamond from the diamond substrate can only be done by sawing or laser cutting, and in any case diamond growth on a curved substrate results in a faceted final stone.

The only single-crystal diamond lenses produced until now have been made by polishing a curved surface onto the diamond using the techniques described above. The spherical surfaces of such lenses have radii of curvature much larger than half the diameter of the lens and are thus not suitable for use in SILs (where the radius of curvature is equal to half the diameter of the lens). Previous single crystal diamond lenses also have large deviations from an ideal spherical surface, depending on the fraction of a sphere that is polished.

In addition, when polishing flat diamond surfaces using traditional techniques, the diamond object is typically gripped in a device known as a "tang" and then manually pressed with considerable force against the surface of the rapidly rotating polishing scaife. However, no accurate control is available that enables removal of a layer of diamond having a prescribed thickness. It is therefore not easily possible to control the thickness of the lens to the tolerance required when fabricating a SIL.

When a SIL is used for DVD applications, diffraction-limited performance is required for the optical system including the diamond SIL at short UV range wavelengths, e.g. 405 nm and 266 nm. The only natural diamond material which allows transmission of such short wavelengths is diamond of type IIa, which has a very low concentration of nitrogen impurities, typically below 25 ppm. However, type IIa natural diamond frequently suffers from large stresses in the material due to a high density of extended crystal imperfections such as dislocations and stacking faults. Thus, due to stress induced variation in refractive index and stress induced birefringence in the bulk of the diamond material itself, type IIa natural diamond is generally not well suited to make such high quality SILs with diffraction-limited performance. At best, a very low material yield would result from selecting suitable parts out of type Ia diamonds. Due to these variations in crystal quality and differences in material properties due to natural variations, such SILs would have to be tested individually and would have individually different dimensions and shapes to compensate for the material's variability, making them unsuitable for mass production and usage.

In metrology, spherical tips are used to map out the shape and roughness of surfaces made from metals, glasses, ceramics, crystalline, and other materials, whose surface shape needs to be measured with high accuracy. The tip is usually mounted on a partially flexible arm, which is fitted with a highly sensitive detector for sensing any flexing of the arm. Typically, movements of the order of a few nanometers can be detected. At the start of a measurement the tip is brought in contact with the object to be measured. Usually either the arm with the tip or the object to be measured itself is mounted on a XYZ translation stage and/or a rotary stage and the tip or the object is displaced or rotated according to a pre-programmed motion. Deviations of the shape of the object from the shape described by the pre-programmed motion are then detected by the flexing of the arm on which the tip is mounted.

In typical metrology applications, since the object to be measured is in general non-spherical, different parts of the tip are in contact with the measurement object. In order to have a flexing of the measurement arm which is independent of the position on the tip, which is in contact with the object, the tip itself needs to be spherical to an accuracy which exceeds the accuracy of the motion so that the accuracy of the measurement is not adversely affected by the shape of the tip. Currently available tips suffer from the problem of wear, since the tip is in continuous sliding contact with the surface of the object. Especially when hard and/or rough materials are measured, the wear of the tips leads to rapid deterioration of the spherical shape of the tip. This leads to measurement errors when using these tips. In such cases, the tip must be replaced by a new and undamaged tip. This leads to a high cost of measurement caused by the high cost of the tips and the need to recalibrate each new tip. Another common problem with softer materials such as aluminium is a build-up, even during a single measurement, of the material from which the measurement object is made on the surface of the tip, thus leading to measurement errors.

Furthermore in metrology one may want to measure the size of a hole in a material by passing balls of different diameters through the hole and determining the maximum size ball that does pass through the hole. In that case it is important that the balls are exactly spherical, do not deform and have low wear characteristics. For this application a completely spherical ball is not necessarily required, instead a super-hemispherical surface may suffice.

Metrology tool tips and balls are currently made from hard materials such as tungsten carbide, ruby and sapphire but even these materials show wear. Diamond shows exceedingly low wear characteristics and would be an ideal material from which to manufacture metrology tips and/or measurement balls. Further advantages to the use of diamond are provided by its hardness and very low friction coefficient when in contact with most hard and soft materials, including diamond itself. This would make diamond the preferred material for use in a metrology tip or measurement ball. However the problem of shaping a diamond tip into a sphere or super-hemisphere to the required accuracy has until now precluded its use in this application.

Those skilled in the art will appreciate that there are other applications of reference spheres and super-hemispheres, for example in the calibration of callipers, and, generally in sets of three, for defining a plane on which a flat plate may be placed for measurement, for example in an interferometry setup.

SUMMARY OF THE INVENTION

Accordingly, it is an object of the present invention to provide a method that addresses the problems associated with producing single crystal diamond lenses having spherical surfaces of high quality and low radius of curvature. In particular, it is an object of the invention to produce hemispherical or super-hemispherical surfaces on single crystal diamond suitable for Solid Immersion Lenses (SILs). It is a further object of this invention to provide a method that addresses the problems in polishing single crystal diamond lenses or SILs to a required thickness to within high accuracy. It is a further object of this invention to provide a diamond SIL which, when mounted in a suitable optical system, allows diffraction limited performance to be obtained. It is a further object of the invention to provide a diamond SIL which can be used in a DVD readout system for data readout of high density Digital Versatile Discs (DVDs). It is a further object of the present invention to provide a diamond element having suitable physical properties for use as a tool tip in a metrology system.

In accordance with one aspect of the invention there is provided an element of single crystal diamond material having a convex surface formed thereon, the convex surface having at least one, preferably two, more preferably three, more preferably still four, and most preferably five of the following properties outlined below:

(i) The convex surface includes a spherical segment in which the maximum peak to valley deviation from a perfect spherical segment is equal to or less than about 5 μm, more preferably equal to or less than about 3 μm, yet more preferably equal to or less than about 2 μm, more preferably equal to or less than about 1.5 μm, more preferably equal to or less than about 1 μm, more preferably equal to or less than about 500 nm, still more preferably equal to or less than about 300 nm, more preferably equal to or less than about 200 nm, yet more preferably equal to or less than about 100 nm and most preferably equal to or less than about 50 nm.

(ii) The convex surface includes a spherical segment, wherein the root mean square (RMS) deviation of the spherical segment, as measured by averaging over the square of deviations over the spherical segment from an ideal sphere, is equal to or less than about 500 nm, more preferably equal to or less than about 250 nm, more preferably still equal to or less than about 100 nm, yet more preferably equal to or less than about 60 nm, even more preferably equal to or less than about 40 nm, more preferably equal to or less than about 20 nm and most preferably equal to or less than about 10 nm.

(iii) The convex surface has a root mean square surface roughness ($R_q$, as defined in 'Tribology', I M Hutchings, published by Edward Arnold, 1992, pages 8-9) of less than about 30 nm, preferably 10 nm, more preferably 5 nm, yet more preferably 3 nm, and more preferably 1.5 nm.

(iv) The radius of curvature of the convex surface is less than about 20 mm, preferably less than about 10 mm, more preferably less than about 5 mm, yet more preferably less than about 2 mm, yet more preferably less than about 1 mm and yet more preferably less than about 0.5 mm.

(v) The convex surface includes a spherical segment with a conical half-angle greater than about 10°, preferably greater than about 20°, more preferably greater than about 40°, yet more preferably greater than about 60°, more preferably greater than about 80°, more preferably still greater than about 90°, yet more preferably greater than about 110°, more preferably greater than about 130° and most preferably greater than about 150°.

It will be appreciated that a spherical segment with a conical half angle greater than 90° may form the basis for a super-hemispherical segment.

In accordance with another aspect of the present invention there is provided a single crystal diamond lens comprising a diamond element having a convex surface as described above. In one embodiment the lens may be a Solid Immersion Lens (SIL).

A further convex surface may be provided on an opposite side of the element to the convex surface described above. The further convex surface may have the same radius of curvature as the first convex surface, and may be used in a special case to form a complete sphere, or alternatively may have a larger radius of curvature. Other combinations are also possible, including combining a convex spherical surface with a convex aspheric surface, and combining convex surfaces with concave surfaces.

Alternatively, a flat surface may be provided on an opposite side of the element to the convex surface. This is particularly appropriate when the element is a SIL. The flat surface preferably has a roughness at least as low as the convex surface. The thickness of such an element (in the direction normal to the flat surface) is preferably determined to an accuracy of at least 0.2 μm and more preferably 0.1 μm compared to the ideal thickness in applications of solid immersion lenses where equation (2) applies. In other applications, the thickness limits may be slightly relaxed, although the thickness should still preferably be determined to an accuracy of at least 2 μm, more preferably 1 μm, and more preferably 0.5 μm.

Some other applications may also require the greater accuracy of 0.2 μm or 0.1 μm even where equation (2) does not apply.

For use in a lens, the diamond material needs to be of particularly high quality, and the most suitable type of synthetic material for use in a lens is generally type IIa diamond due to its optical properties, and in particular synthetic diamond with sufficiently low levels of impurities to minimise any impurity related absorption. However it will be appreciated that in certain circumstances type IIb diamond, or even type I diamond, may also be used. Natural diamond may be used as long as a piece with sufficiently high uniformity and low internal stress can be found. Alternatively synthetic diamond as grown by the High Pressure High Temperature (HPHT) method or Chemical Vapour Deposition method may be used. In accordance with a further aspect of the invention there is provided a lens formed from single crystal type IIa HPHT diamond material.

However, it is preferred that the diamond material is synthetic single crystal diamond grown by Chemical Vapour Deposition (generally known as CVD diamond).

The single crystal diamond may contain boron at a concentration greater than $10^{16}$ atoms $cm^{-3}$, which is preferably substantially uniformly distributed through the diamond material.

In accordance with another aspect of the invention there is provided a solid immersion lens formed from single crystal diamond material, preferably substantially hemispherical or super-hemispherical in shape.

Such a solid immersion lens is designed to be inserted into a recording apparatus extremely close to the recording medium. In such circumstances the outer edges of the flat surface have little use in the optical function of the element and it is often beneficial for mechanical reasons to provide a tapered section on an opposite side to the spherical surface—i.e. between the spherical surface and the flat surface.

In accordance with a further aspect of the invention there is provided an optical information recording and/or reproducing apparatus, or an optical pickup device, comprising:
  a recording medium;
  a laser light source; and
  a converging lens unit including a solid immersion lens as described above disposed adjacent the recording medium.

The invention also provides for microscopy apparatuses, lithography apparatuses and probes, such as endoscopic probes, comprising a single crystal diamond lens as described above.

Those skilled in the art will appreciate there is a wide range of other applications, particularly optical and mechanical applications, for diamond formed in the shapes made possible by this invention. One such application is use as a measuring tip or stylus in a metrology apparatus. For such an application the optical properties of the diamond are less important, and indeed it may even be desirable for the diamond to be opaque so that it is easier to see. It is more important to ensure that the diamond has reliable wear characteristics. Suitable materials therefore include natural type Ia diamond, natural or synthetic type Ib diamond, and natural or synthetic type IIb diamond. The preferred material is again CVD diamond.

Type IIb diamond contains boron, and this is known to reduce the wear rate. This is a particularly useful property if the boron is uniformly distributed through the material. If the boron is non-uniformly distributed an uneven wear rate will result. It will also make it more difficult to achieve the convex surface with the necessary degree of control. To achieve uniform boron distribution it is preferred that the element is formed from CVD boron-doped diamond, such as is provided by WO 03/052174.

Thus in accordance with a further aspect of the present invention there is provided a metrology apparatus, comprising:
  an arm which is at least partially flexible;
  a movement sensor operatively associated with the partially flexible arm; and
  a tool tip located at one end of the partially flexible arm, the tool tip comprising a diamond element as described above.

Further applications of single crystal diamond elements include reference spheres for use in measuring the diameters of holes, calibrating measurement apparatuses such as calipers, and for use as references that define a plane. In general it is possible to define a flat reference surface by 3 points: in practice, the surface is laid on top of 3 balls, but these need not be full spheres. Single crystal diamond elements in accordance with the present invention are well suited to this application as they are hard, exhibit low wear, and can be manufactured to very precise size tolerances.

A further application for substantially spherical single crystal diamond elements is as bearings. The exceptionally low wear of diamond makes it a particularly appropriate material for such use.

The single crystal diamond material may preferably incorporate a mark of origin such as a brand mark, or "fingerprint" so that the origin of the material can be identified. A suitable method for incorporating a mark of origin into CVD single crystal diamond material is described in WO 2005/061400. Where the element is used as a lens, it is important to ensure that the mark does not adversely affect the optical properties of the material.

In accordance with another aspect of the present invention there is provided a method of forming a rotationally symmetrical surface on a single crystal diamond element, the method comprising:
  rotating a blank formed from single crystal diamond material about a first axis;
  applying a laser beam to the blank, the laser beam supplying sufficient light intensity to cut the blank; and
  translating the laser beam relative to the blank along a two-dimensional path;
  whereby the simultaneous rotation of the blank and translation of the laser beam relative to the blank results in a rotationally symmetrical surface being cut in the blank.

It will be appreciated that translation of the laser beam relative to the blank may be achieved by translating the blank and keeping the laser stationary.

The rotationally symmetrical surface is preferably a spherical surface, in which case the translation of the laser beam relative to the blank may follow a path substantially described by an arc of a circle having a central axis passing through the centre of curvature of the spherical surface, so that the simultaneous rotation of the blank and translation of the laser beam relative to the blank results in the substantially spherical surface being cut in the blank. The path followed by the laser beam relative to the blank may deviate a predetermined amount from the precise arc of the circle when the laser beam is close to the axis of rotation of the blank.

It will be appreciated that the method described above may also be adapted to form other shapes apart from spherical. The method allows the production of rotationally symmetrical diamond elements usable in a range of applications, for example diamond anvils for use in high pressure cells. Such a rotationally symmetric shape may be the final shape of the object or an intermediate shape which is then further processed. In preferred embodiments (and in particular for the production of a spherical surface) the laser beam should be applied to the blank in a direction substantially perpendicular to the first axis, and the laser should be translated relative to the blank in a plane perpendicular to the laser beam.

In a preferred embodiment, the blank is formed by cutting a disc from a diamond plate using a laser. The disc should have a thickness slightly greater than the thickness of the element to be formed. As used herein, the word "disc" is intended to include cylinders whose height is less than, equal to or greater than their diameter. It will also be appreciated that the curved edge of the disc may not be exactly perpendicular to the flat surfaces either side: the curved edge may form a section of a cone as a result of the constraints of laser cutting. The blank is preferably mounted on a carrier rotatable about the first axis. This carrier may be a cylindrical metal rod, and the blank is preferably brazed onto the rod to enable simple removal. Alternatively, the blank may be left on the rod, and this may even form the finished product. This may be useful, for example, in the construction of a metrology apparatus.

The method described above results in a single crystal diamond element having a spherical surface which may be sub-hemispherical, hemispherical or super-hemispherical. The method produces spherical surfaces with low deviations from a perfect spherical surface and surface roughness. However, for certain applications it may be necessary to polish the element further to improve the sphericity and surface finish.

Thus in accordance with another aspect of the present invention there is provided a method of polishing a spherical surface on a single crystal diamond element, comprising:
  rotating the element about a first axis at a first rate of rotation;
  pressing a cup having a polishing surface against the spherical surface, the polishing cup rotating about a second axis at a second rate of rotation much higher than the first rate.

In one embodiment the cup additionally rotates about a third axis at a third rate lower than the first rate, the third axis being perpendicular to the first axis and passing through the first axis at the centre of curvature of the spherical surface, the rotation about the third axis being an oscillatory motion describing less than 360° and preferably less than 180°. The rate of rotation about the third axis may vary, preferably randomly, to improve the averaging over the whole surface.

In a preferred embodiment, the first axis is aligned along the crystallographic <100> direction. This ensures that the element is polished equally over all crystal directions, and results in any imperfections having four-fold symmetry. In an alternative embodiment the first axis is aligned along the crystallographic <111> direction. This results in the "hard" polishing surface of the element being located at the apex of the spherical surface, which naturally receives the most polishing as a result of the rotation of the element.

The polishing surface of the cup is preferably a hard material to ensure slow and controllable polishing of the spherical surface. In one embodiment the polishing surface may comprise a layer of diamond powder embedded in a former such as resin or phosphor-bronze. However, it is preferred that the polishing surface comprises a layer of sintered diamond particles.

One suitable polishing surface comprises a layer of polycrystalline diamonds grains sintered together at high temperature and pressure in the presence of a cobalt-rich second phase. This promotes the sintering together of the diamond grains to form a cohesive polycrystalline mass in which the spaces between the grains are filled by the cobalt-rich second phase. One example of such material is PCD Syndite®.

Another suitable polishing surface comprises a layer of polycrystalline diamond sintered together at high temperature and pressure in the presence of a second phase. The second phase is ceramic and fills all space between the diamond grains so that the material is fully dense. One example of such material is PCD Syndax®.

A further alternative for the polishing surface is provided by a diamond-silicon carbide composite material made by a reaction bonding process. The material comprises diamond particles in a predominantly silicon carbide matrix and one example of such material is Skeleton® cemented diamond.

In a further alternative, the polishing surface may comprise a layer of polycrystalline CVD diamond.

The polishing surface may be concave, such that it substantially matches the shape of the spherical surface to be polished. Alternatively, the polishing surface may initially be substantially flat, the polishing surface being worn into the necessary concave shape by the action of polishing the spherical surface of the element.

The diamond element may be a lens, and the method of the invention may additionally comprise forming or polishing a second spherical surface on the element on the opposite side to the spherical surface using the same technique as used to form or polish the first spherical surface. If the radii of curvature of the two spherical surfaces are not the same, the second spherical surface preferably has a larger radius of curvature than the first spherical surface so that the spherical surface having the smaller radius of curvature is formed first.

Alternatively a flat surface may be polished on the opposite side of the element to the spherical surface. This may be performed by pressing the diamond element against a polishing wheel. The diamond element may be mounted in a holder comprising a spherical cup as it is pressed against the polishing wheel. The thickness of the element is preferably controllable to within 2 µm, more preferably 1 µm, more preferably still 0.5 µm, more preferably 0.2 µm, and most preferably 0.1 µm.

An element formed by this method may be a SIL and, as mentioned above, in certain applications it is beneficial to remove the outer portion of the flat surface from such a device. Accordingly, the method may additionally comprise forming a tapered section between the spherical surface and the flat surface of the element. This may preferably be achieved by polishing a plurality of flat facets.

The invention also provides a single crystal diamond element, preferably a lens, preferably a solid immersion lens, formed by the methods described above. The SIL may be substantially sub-hemispherical, hemispherical or super-hemispherical. The element is preferably formed from single crystal CVD diamond material.

The method may also include forming an element which has a mounting hole or cone formed in the opposite side to the convex surface. Where the element is used as a metrology tool tip, for example, this may facilitate the mounting of the tip onto its partially flexible arm.

The invention also provides apparatus for carrying out the methods described above. Thus according to a further aspect of the invention there is provided an apparatus for forming a spherical surface on a single crystal diamond element, the apparatus comprising:
  a spindle rotatable about a first axis and adapted to receive a single crystal diamond blank;

a source of laser light for directing a laser beam towards the diamond blank when mounted on the spindle, the laser beam being directed in a direction substantially perpendicular to the first axis; and translation means for translating the laser light source relative to the spindle along a two-dimensional path in a plane perpendicular to the laser beam.

In a further aspect there is provided apparatus for polishing a spherical surface formed on a single crystal diamond element, the apparatus comprising:

a rotary stage adapted to receive the element and being rotatable about a first axis;

a polishing cup mounted on a high speed rotary spindle; and means for pressing the polishing cup onto the element.

The high speed rotary spindle is preferably mounted on a rotary arm, the rotary arm rotatable about an axis perpendicular to the first axis and passing therethrough at the centre of curvature of the spherical surface.

BRIEF DESCRIPTION OF THE DRAWINGS

Some preferred embodiments of the invention will now be described by way of example only and with reference to the accompanying drawings, in which.

DESCRIPTION OF THE INVENTION

Figure 1:
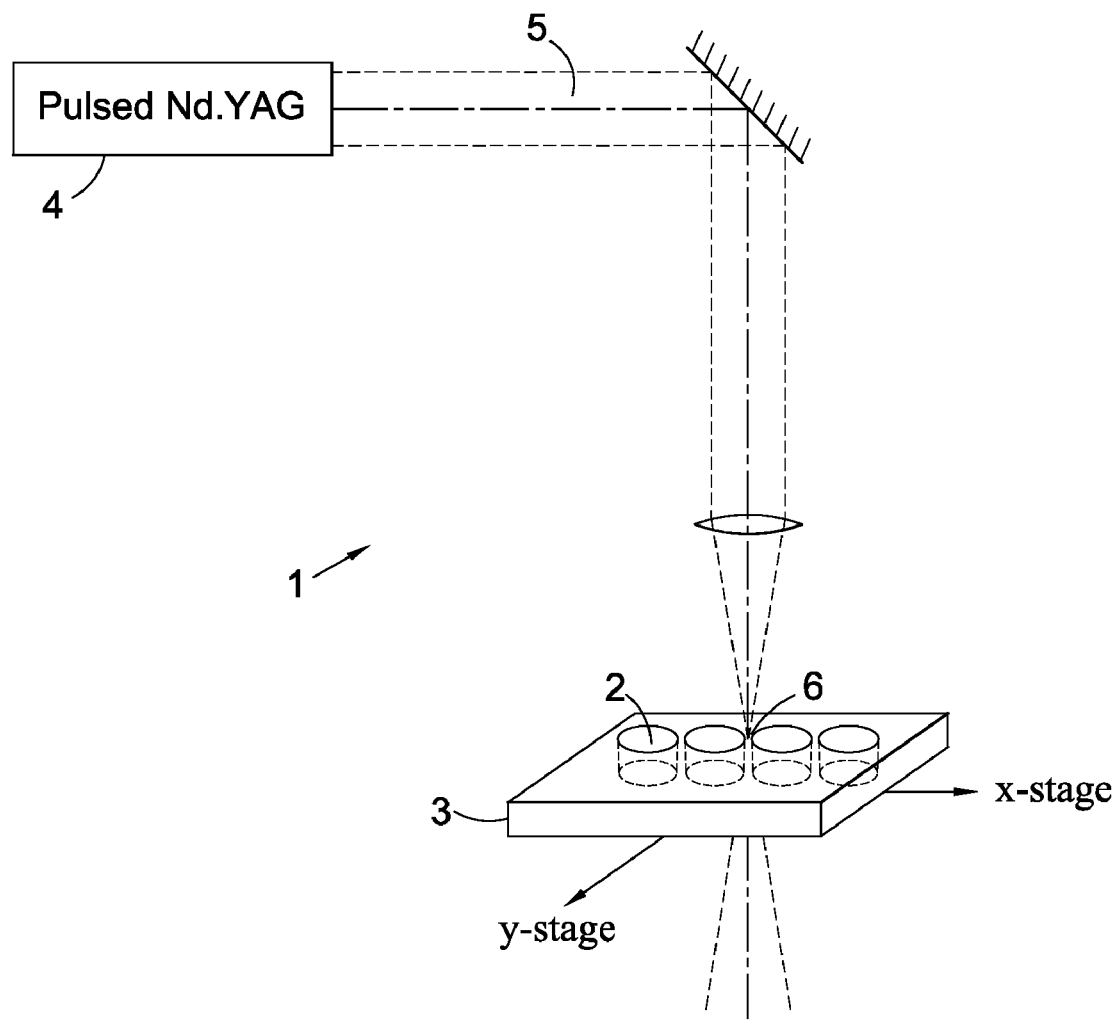
FIG. 1 is a schematic view of an apparatus for cutting cylindrical sections out of a diamond plate.

FIG. 1 is a schematic view of an apparatus 1 for cutting cylindrical sections 2 from a diamond plate 3 for use as blanks onto which spherical surfaces can be formed. The apparatus comprises an X-Y translation stage (not shown) onto which the diamond plate 3 is mounted. A cutting laser 4, for example a pulsed Nd:YAG laser, generates a light beam 5 which is focussed onto the diamond plate 3 and which has sufficient energy to cut the diamond of the plate.

The translation stage carrying the diamond plate 3 executes a substantially circular motion with respect to the position of the focus 6 of the laser beam, and as a result a cylinder is cut out of the diamond plate. The width of the plate is chosen to be larger than the size of the diamond element which will eventually be formed.

In practice, the laser light is focussed to a spot 6, initially on the surface of the plate 3. This means that the cut into the plate 3 must generally have a "V" shaped cross-section in order to ensure that the focus can be maintained lower down the cut. As a result, cylinders 2 cut from the plate are often not perfect cylindrical sections, but usually have curved surfaces which are narrowly inclined—i.e. the shape cut from the plate 3 is effectively a slice of a cone. It will be understood that the words "cylinder" and "disc" as used herein are intended to encompass such shapes, and that they also should encompass any relationship between diameter and length (of cylinder) or width (of disc).

Figure 2A:
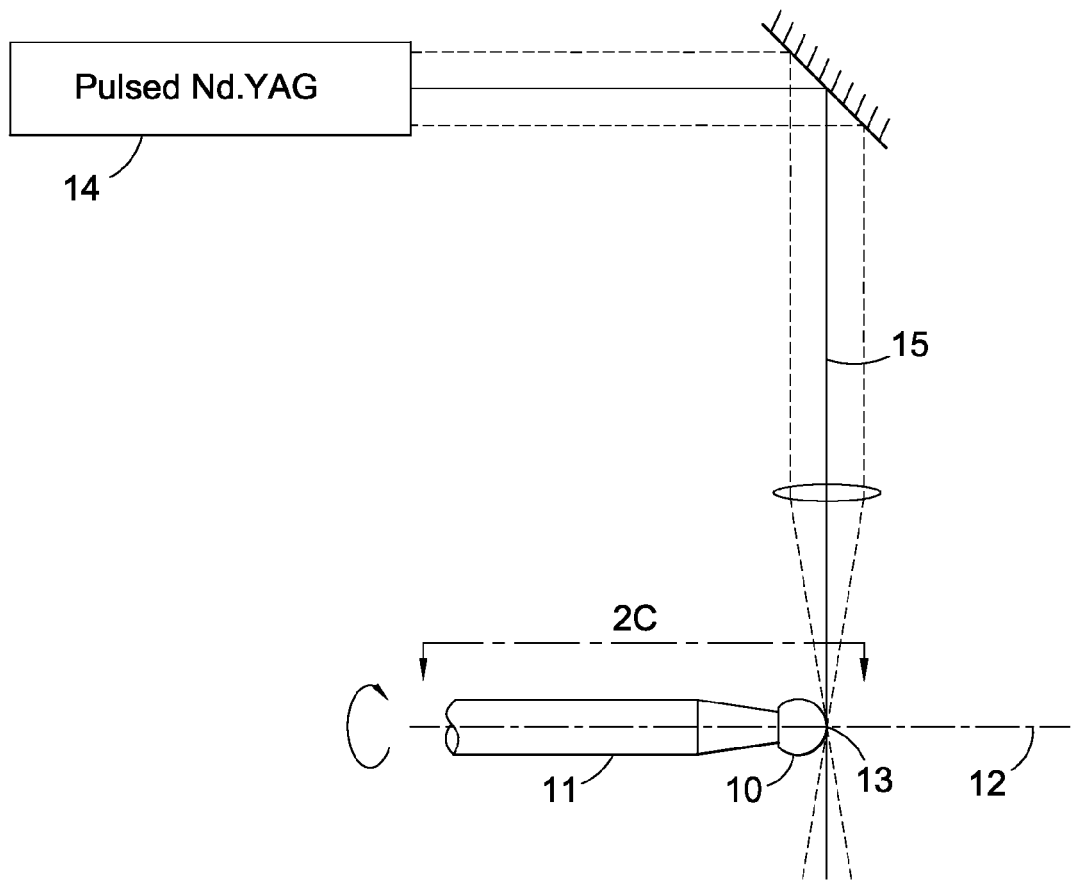
FIG. 2 shows a schematic view of a system for cutting a substantially spherical shape onto a diamond element.
Figure 2B:
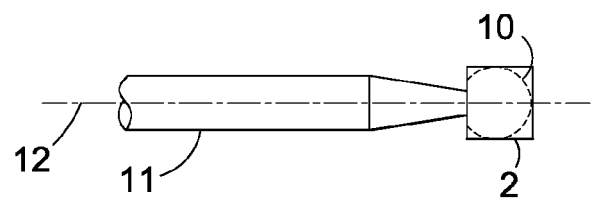
Figure 2C:
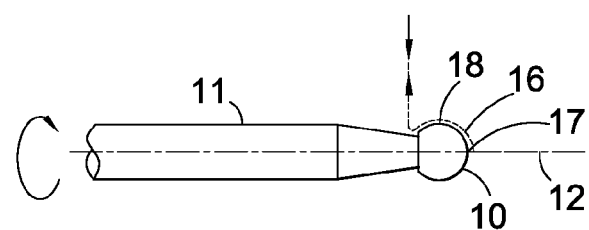

FIGS. 2A to 2C show a schematic view of an apparatus for cutting a spherical surface 10 into the diamond cylinder 2. As shown in FIG. 2B, the diamond cylinder 2 is brazed with one of its flat sides onto a cylindrical rod 11 made, for example, from molybdenum or tungsten carbide. Tungsten carbide is preferred because of its hardness. The brazing material should be an alloy of copper, silver and titanium or an alloy of gold and tantalum, although it will be appreciated that other materials may be used. Before brazing, the diamond cylinder 2 is positioned with its symmetry axis 12 as accurately as possible coincident with the symmetry axis of the rod 11.

The rod 11 is mounted in a high speed rotating spindle (not shown). The diamond cylinder 2 mounted on the rod 11 is positioned close to the focus 13 of a high power laser 14 so that the axis of rotation 12 of the spindle is perpendicular to the direction of the incoming laser light 15. The spindle is mounted on a translation stage (not shown) so that the diamond cylinder 2 can be translated in two dimensions in a plane perpendicular to the direction of the incoming light, as shown in FIG. 2C. (In FIG. 2C the laser beam is normal to the plane of the paper.) By translating the cylinder relative to the laser 14 as it is rotated, a shape can be cut out of the diamond that has rotational symmetry with respect to the rotation axis 12 of the spindle. If the translation follows the arc of a circle 16, the surface 10 cut into the cylinder 2 is spherical. It will be appreciated that this apparatus may be used to cut other rotationally symmetrical shapes from the diamond cylinder 2 and is not limited to spherical surfaces. For example, the apparatus could be used to prepare single crystal diamond anvils for use in high pressure cells. Alternatively, aspheric surfaces, such as a paraboloid or ellipsoid shapes, may be formed.

It will be appreciated that, at the point 17 on the cylinder furthest from the spindle (i.e. on the axis of rotation, at the "pole") the linear speed of the element surface will be slow compared to a point 18 far from the axis of rotation (i.e. on the "equator"). The laser therefore cuts faster at the pole 17, as it is cutting substantially at the same point all the time. There is therefore a danger that, if the laser light 15 exactly follows the arc of a circle relative to the cylinder 2, the pole 17 of the spherical surface 10 will be slightly flattened as a result of the additional cutting. This problem can be overcome by ensuring that the path 16 of the laser deviates slightly from a perfect arc, so that at the pole 17 it moves slightly further away from the spindle than a perfect arc would suggest.

If a spherical surface is formed, deviations from the ideal spherical surface are typically less than 20 μm, and may be less than 15 μm, 10 μm and even 5 μm. The surface itself at this stage typically has a RMS roughness of order 1 micron, although a RMS roughness of 200-300 nm is achievable. For some applications this may be sufficient, in which case no further processing will be necessary. However other applications require higher specifications for the sphericity and roughness of the element. In such cases further polishing will be necessary.

Figure 3:
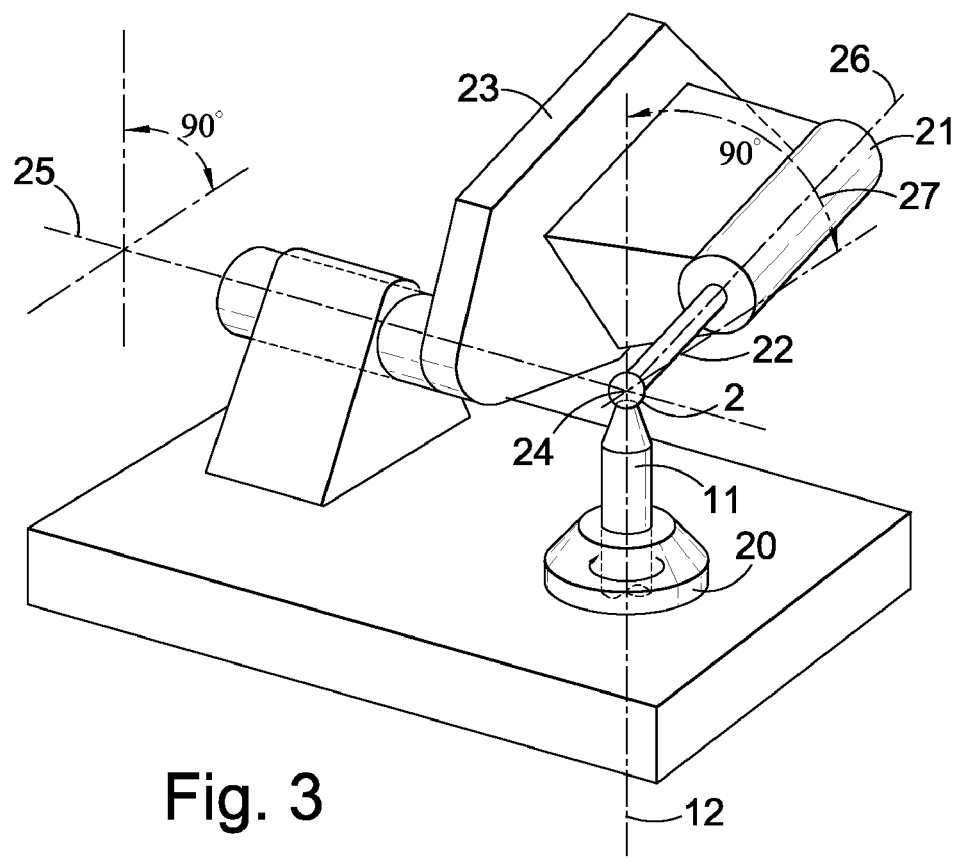
FIG. 3 shows a schematic view of a polishing setup for improving the spherical surface of the element by polishing.

FIG. 3 is a schematic view of an apparatus for polishing the spherical surface on a diamond element 2 to improve the characteristics. The element 2, still brazed to the rod 11, is mounted in a rotational stage 20, which rotates at a low rate of typically 0.1-100 rpm around the axis 12 of the rod 11.

A high-speed rotary spindle 21 fitted with a polishing cup 22 is pressed against the rotating diamond element 2. The force with which this cup 22 is pressed against the sphere may be adjusted by a spring (not shown) and depends on the size of the element 2 to be polished. Typically a force between 0.20 and 6 N is used. The rotary spindle rotates at a rate of the order of 5,000-60,000 rpm. The rate to be used depends on the radius of curvature of the spherical surface 10.

The polishing cup 22 has a polishing surface formed of a suitable hard material for polishing diamond. In one embodiment the polishing surface includes diamond particles embedded in a former such as phosphor-bronze or resin.

Phosphor-bronze cups can be made on a Computer Numerically Controlled (CNC) turning lathe. Resin-bond cups can be produced by casting a diamond-filled resin in a mould with an appropriate radius of curvature equal to the desired radius of curvature of the spherical surface of the diamond element. Alternatively, particularly for very small radii (typically a desired radius less than about 2 mm) the cup 22 may be made out of a small cylinder of resin-bond material with a central hole so that the desired shape is produced in the cup during the polishing process itself. At the end of the polishing step, when the diamond spherical surface is finished, the resin cup has a concave spherical shape matching the convex spherical surface of the diamond element.

The high-speed rotary spindle 21 itself is itself mounted on a rotary arm 23, which rotates slowly around an axis 25 that is perpendicular to the axis 12 of the rotary stage and passes through it at the centre of curvature 24 of the spherical surface 10. The axis of rotation 25 of the rotary arm is also perpendicular to the axis 26 of the high-speed rotary spindle. Rotary motion around this axis 25 is not over a full circle: instead an arc 27 is described in a bi-directional oscillatory motion, the angle of the arc 27 depending on the extent of the spherical surface on the diamond element. For a super-hemispherical surface 10 the arc may subtend an angle of approximately 90°. The period of this oscillatory motion is greater than the period of the rotary stage 20, typically between 3-10 times the period of the rotary stage 20. In a preferred embodiment the period of the rotary arm 23 is not constant, so as to improve the averaging over the whole spherical surface 10. The period may change randomly.

It will be appreciated that if the cup 22 is sufficiently large compared to the size of the spherical surface, the cup can be kept at a fixed position relative to the element 2 and rotated only about its own axis 26. In this arrangement, the cup 22 is fixed such that it contacts the element 2 over an area which includes the apex of the diamond spherical surface 10 and which extends to the edge of the spherical surface.

In this step the different hardnesses of different polishing directions still causes deviations of the diamond spherical surface from an ideal spherical surface. This deviation depends on the area of the spherical surface 10 relative to a full sphere with the same radius of curvature, and also on the directions of the hard (difficult to polish) and soft (easy to polish) crystal directions of the diamond with respect to the surface. A hemispherical or super-hemispherical surface with its apex in the <100> crystal direction is polished over all crystal directions. The deviations of such a surface, with a radius of curvature of between 0.5 and 2.5 mm, from an ideal super-hemisphere can be made to be equal to or less than 5 μm, and deviations less than 3 μm, 2 μm and even 1.5 μm can be achieved. Such deviations may be measured optically using an interferometer, or mechanically using a metrology apparatus. RMS Surface roughness can be reduced to below 30 nm, and RMS roughness below 10 nm, 5 nm 3 nm and even 1.5 nm can be achieved.

If the diamond element 2 is to be used as a lens, it is necessary that the material has suitable optical qualities. For example, a SIL for use in DVD applications must show transmission at UV wavelengths of 405 nm and 266 nm. One possible material showing such transmission is natural type Ia diamond. However, it has been found that the highest surface accuracy is very difficult to obtain using such material. The internally present stresses caused by large numbers of dislocations and stacking faults in general preclude the highest quality polishing of the surface. Therefore in addition to the known problems of inhomogeneity and birefringence due to internal stress in natural type IIa diamond, internal stress has also been found to adversely affect the ultimate shape of the diamond sphere when produced out of natural type IIa material.

As an alternative, single crystal synthetic material may be used, which has the benefit of being a consistent engineered material. Single crystal diamond may be grown by Chemical Vapour Deposition on a single crystal diamond substrate, and suitable material is described, for example, in WO 2004/046427. This material can be produced with very low nitrogen impurity content, and therefore has optical transmission characteristics similar to natural type IIa diamond. In particular, it is transparent at the UV wavelengths of 405 nm and 266 nm identified above. Furthermore the internal stress and associated birefringence and refractive index variations are low enough for use in DVD applications.

In a further alternative, synthetic type IIa diamond produced in a high-pressure press at high temperatures (HPHT) may be used. Suitable material may be obtained from Sumitomo Electric Company (Japan) or from Element Six (England). This material has some of the favourable properties of CVD-grown single crystal diamond With high quality synthetic material used for the diamond element, a further improved surface accuracy can be obtained by replacing the resin-bond polishing cup 22 by a cup made out of single crystal diamond, or sintered polycrystalline diamond such as PCD Syndite®, PCD Syndax® as produced by Element Six Ltd of Shannon, Ireland, Skeleton® cemented diamond as was produced by Stockholm Termobehandling AB of Stockholm, Sweden, or polycrystalline diamond grown by chemical vapour deposition. A cup 22 may be produced by cutting a disc from a plate of one of the materials listed. The disc is then mounted on a carrier which is then mounted on the high-speed rotary spindle 21. The disc can be mounted on the carrier by brazing, soldering or gluing.

A central hole is then drilled in the disc, for example by using a laser. The cup 22 may be pre-shaped with a concave spherical surface by polishing with a diamond sphere of approximately the same diameter on a high-speed lathe. Thus a polished surface on the cup, approximately fitting the radius of the diamond spherical surface to be polished, is formed. Alternatively, the disc may be left flat, so that a polished cup shape is formed by the action of polishing the spherical surface on the single-crystal diamond element, with a radius of curvature matching that of spherical surface 10.

Using synthetic material for the diamond element and hard polishing materials as described above, it has been found possible to produce a sub-hemispherical, hemispherical or super-hemispherical surface with deviations from the ideal spherical shape that are less than or equal to 1.5 μm, and surfaces with peak-valley deviations less than 1 μm, 500 nm, 300 nm, 200 nm, 100 nm and even 50 nm have been achieved. Using this technique, it is possible to produce spherical surfaces where the RMS deviation of the shape, as measured by averaging over the square of the deviations over the polished surface from the ideal sphere, is less than or equal to 500 nm, and RMS deviations less than 250 nm, 100 nm, 60 nm, 40 nm, 20 nm and even 10 nm have been achieved.

In many applications the surface opposite the spherical surface 10 just described must be polished to the same precision. SILs generally require a flat surface opposite the spherical surface. Furthermore, in many cases it is necessary to produce a diamond element with a very precisely defined thickness. For example, a super-hemispherical diamond SIL which will show diffraction-limited performance when mounted in an appropriate optical system must be produced with a thickness within 0.2 μm, and preferably within 0.1 μm, of the theoretical thickness defined in Equation (2) above. For a hemispherical diamond SIL the thickness must be within 2 µm and preferably within 1 µm of the theoretical thickness defined in Equation (1).

Figure 4:
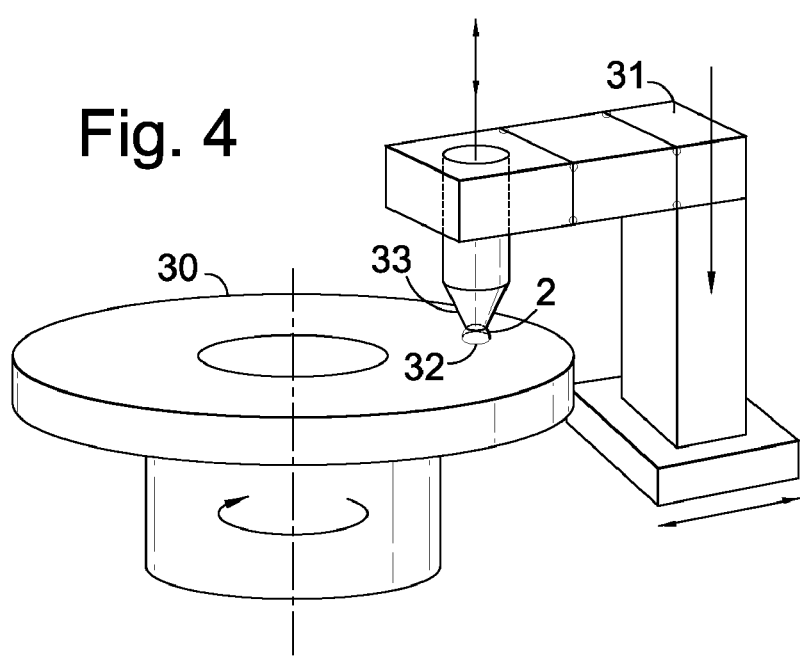
FIG. 4 shows a schematic view of a high speed polishing scaife for polishing a flat surface onto the diamond element.

FIG. 4 shows a schematic view of a high speed polishing scaife 30 onto which the diamond element 2 can be pressed by means of an automated polishing arm 31 in order to polish a flat surface 32 opposite the spherically shaped surface 10.

The diamond element 2 is removed from the rod 11 on which it was mounted for the steps shown in FIGS. 1 and 2. This can be achieved by heating the assembly above the melting temperature of the solder or braze with which the diamond is mounted, or alternatively by dissolving the rod 11 in, for example, a mixture of nitric and sulphuric acid in water. The element 2 is then mounted in a holder 33 with a spherical cup that matches the radius of curvature of the spherical surface of the element. The element can be held in place in the cup by applying a vacuum between the element and the cup. Alternatively, a super-hemispherical element can be pressed into the cup by a thin metal plate having an appropriate size hole, through which the element extends.

The holder 33 is then placed in the polishing arm 31, and lowered towards the polishing scaife 30. The scaife 30 may be made from cast-iron or phosphor-bronze, or may be a resin-bond polishing wheel. The polishing arm 31 is lowered towards the scaife 30 wheel by means of an air pressure driven piston and cylinder with a reproducible speed and at right angles to the surface of the scaife. By adjusting the air-pressure, the force with which the diamond element 2 is pressed against the scaife can be adjusted. In addition, the polishing arm 31 can be moved away from the scaife with the air-pressure driven piston and cylinder.

In an alternative embodiment, the force with which the polishing arm 33 holding the diamond element 2 is pressed onto the polishing scaife can be adjusted by means of a spring, whose tension can be controlled by a lead screw. Polishing may be carried out in steps, where each polishing step is applied for a controlled period of time (adjustable, for example, in increments of 10 seconds). The thickness can then be measured in between steps, for example by means of a Heidenhain displacement meter with an internal glass ruler that measures to an accuracy of 0.1 µm. It is thus possible to polish off diamond layers in a repeatable fashion and adjust the thickness of the element 2 to within 0.1-0.2 µm.

For super-hemispherical SILs it is often desirable that the flat surface of the SIL does not directly intersect the spherical surface, but rather that the two surfaces are connected by a tapered section. Only the central section of the flat side of the SIL is used optically in an optical readout and recording system, and the edges are not important optically. Furthermore, the SILs is located very close (typically 25 nm) to the surface of the DVD and in order to reduce the chance that the sides of the SIL interfere or even collide with the DVD, it is preferable to remove the sides.

Conical surfaces connecting the flat central section (typically of approximately 30 µm diameter) with the spherical surface can be made by bruting or laser cutting, although it is preferable to polish flat facets similar to the pavilions on a brilliant cut diamond or a high-pressure diamond anvil. If this system is used, a central octagonal shaped section of the original flat surface is left, and eight pavilion facets connect it to the spherical surface. As a further enhancement to improve manufacturability, intermediate facets similar to the bevels on a high-pressure anvil may be made that connect the flat tip of the SIL with the pavilions.

It is also possible to use the above methods to produce a double-convex lens. If the convex surfaces on opposite sides have different radii of curvature, the side 10 with the smallest radius of curvature should be polished first according to the method described above. The diamond element 2 is then removed from its rod 11, by heating the assembly above the melting temperature of the solder or braze with which the diamond was mounted, or dissolving the rod in an acid bath. If the radius of curvature of the second side is much larger than half the diameter of the lens, the second convex side may be polished using a resin-bond wheel or scaife with a large radius of curvature in accordance with the prior art.

If a smaller radius of curvature is required for the second side, the element 2 is mounted in a metal holder with a spherical cup that matches the radius of curvature of the first spherical surface 10, and soldered or brazed in place. In preferred embodiments an alloy of gold and tantalum or of copper, silver and titanium is used, and the holder is made from molybdenum or tungsten carbide. A substantially spherical surface is then laser cut onto the diamond element using a method similar to that described above with reference to FIG. 2, and the spherical surface improved using a method similar to that described with reference to FIG. 3. The diamond element 2 is then removed from the metal holder by heating the assembly above the melting temperature of the solder or braze, or by dissolving the metal chemically, and a double convex lens is produced.

By suitably combining steps in the manner described above, it is also possible to form a complete sphere.

The embodiments described above have generally related to the production of a single crystal diamond element for use as a lens, but it will be appreciated that further applications are possible. For example, an element with a spherical surface which is a significant portion of a whole sphere may be used as a tool tip in a metrology apparatus. The methods for forming the element are broadly similar, but the material to be used may be different. In particular, the optical properties required of material to be used in a lens no longer apply, and mechanical characteristics are more important. Resistance to wear is an important factor.

Particularly suitable materials for forming a diamond element for use as a tool tip in a metrology apparatus include type Ia natural diamond, type Ib natural or synthetic diamond, and type IIb natural or synthetic diamond. Single crystal CVD diamond is a particularly suitable material for use as a metrology tool tip. As described above, the sphericity and surface roughness can be controlled to a very high specification.

In addition, boron doping of diamond may reduce the wear rate, which is a useful property in metrology applications. However, it is beneficial that any boron doping is uniform throughout the diamond element: otherwise the spherical surface cutting and polishing processes may result in an uneven surface. In addition, an uneven wear rate enhanced by non-uniform boron doping is undesirable in the tool tip itself. It is therefore preferred that diamond elements for use as metrology tool tips are formed from CVD diamond uniformly doped with boron, as described, for example, in WO 03/052174.

It will be further appreciated that single crystal diamond elements having spherical surfaces formed thereon may also be useful in a number of other applications, including those described earlier.

EXAMPLES OF EMBODIMENTS

Example 1

Super-Hemispherical Synthetic CVD-Grown Single-Crystal Diamond SIL with 8-Sided Pavilions A super-hemispherical SIL was made from CVD-grown synthetic single-crystal diamond. A CVD grown diamond, approximately 4.5×4.5×3 mm in size, was first sawn into plates of approx. 1.2 mm thick. One plate was then polished flat on one side and mounted onto a graphite carrier plate and placed on an XY translation stage in the focus of a pulsed Nd:YAG cutting laser. Pulse energy was 1.2 mJ in a 150 ns pulse with a pulse repetition rate of 4000 pps (pulses per second). The XY-stage then executed a circular motion with diameter 1.3 mm so that a cylindrical disc was cut out of the plate with diameter 1.3 mm.

Subsequently the disc was cleaned to remove any laser residue and brazed with the polished side onto a molybdenum rod which was 20 mm long and 3 mm in diameter with a eutectic alloy of gold and tantalum. The axis had a tapered end such that at the tip where the diamond was soldered its diameter was 0.7 mm. Prior to brazing, the diamond disc was placed on the tip of the molybdenum rod and centred with respect to the symmetry axis of the molybdenum rod to within 0.07 mm.

Subsequently the rod was mounted in a high-speed rotational spindle and this spindle was placed on an XY-translation stage near the focus of the Nd:YAG cutting laser with its axis perpendicular to the incoming light beam. Pulse energy was 1.2 mJ in a 150 ns pulse with a pulse repetition rate of 4000 pps. The spindle rotated at 550 rpm. The XY-stage executed a circular motion over approximately ⅜ the circumference of a circle in a bi-directional movement in a plane perpendicular to the incoming focused laser beam at a linear speed of 5 mm/min. Slight corrections to the circular motion were applied when cutting close to the axis of rotation, otherwise a slightly flattened surface would be cut out due to the low speed of rotational motion close to the rotation axis. Thus a super-hemispherical surface with a radius of 0.47 mm was cut out of the disc with deviations from an ideal spherical surface of less than 5 µm. RMS surface roughness ($R_q$) was approximately 1.4 µm The diamond super-hemisphere on its molybdenum rod was then mounted on a rotary stage, which rotated at 20 rpm. A resin-bond cup mounted on a high-speed rotary spindle, which ran at 20000 rpm, was pressed against it with a force of 4 N. The resin-bond cup was made out of a disc of diamond-filled resin material with mean diamond particle size between 20 and 40 µm, in which a central hole of 300 µm in diameter was made. The disc was pressed against the pre-cut diamond sphere and during the polishing process the disc obtained a spherical shape, matching the radius of the diamond sphere. The high-speed spindle was mounted on a rotary arm, which could rotate around an axis of rotation that intersected the symmetry axis of the diamond sphere on the molybdenum rod at the centre of curvature of the diamond sphere. At this stage this arm was not moving but kept still at a fixed position and care was taken to adjust the angle of the arm such that the resin-bond disc made contact over an area that covered the apex of the diamond super-hemisphere up till the edge of the super-hemispherical surface. In this manner a super-hemispherical diamond surface was polished with deviations from an ideal spherical surface smaller than 2 µm. RMS surface roughness was less than 1.5 nm.

Subsequently the resin-bond cup was replaced by a disc of PCD Syndite® with a 2 µm mean diamond particle size. The disc had a central hole of 400 µm and was mounted in a carrier that mounted in the high-speed rotary spindle. The PCD disc was pressed against the diamond super-hemisphere with a force of 3 N. The spindle was rotating first at 10000 rpm and after 4 hours this was reduced to 6000 rpm. The arm on which the spindle was mounted was set to rotate over approximately 50° in a bidirectional motion. After a further 6 hours of polishing, a super-hemispherical surface was obtained with a radius of curvature of 0.45 mm and a maximum deviation from the ideal spherical surface of less than 45 nm. The RMS deviation as measured over the surface of the super-hemispherical surface from the ideal spherical surface was equal to 5.6 nm. For another super-hemispherical diamond surface, prepared in an identical fashion, the RMS deviation was 7.3 nm, while for yet another sample the RMS deviation was 5.4 nm.

The diamond was then removed from the molybdenum rod by dissolving the molybdenum in a mixture of nitric and sulphuric acid in water and, after rinsing in demineralised water and drying, was mounted in a sub-hemispherical cup made into the form of a 'brass pen' (that is a rod with a central hole through which to apply vacuum, and a concave cup at one end to hold the diamond lens) with a vacuum holding the diamond in place. Subsequently, the pen with the diamond was mounted in a polishing arm and was pressed onto a resin bond wheel with 20-40 µm average particle size, rotating with a linear speed of 3 m/s. The force with which the diamond was pressed against the resin bond wheel was kept constant at 2 N. Initially, when the diamond lens was more than 200 µm thicker than the desired thickness, polishing was done rapidly. When the thickness of the diamond lens was approximately 3 µm above the target thickness, diamond was polished off in steps of approximately 0.1 µm. For this diamond super-hemispherical SIL the radius of curvature was measured as 448.9 µm and the target thickness was 631.6 µm. Final thickness was to within 0.1 µm of the target thickness Subsequently the diamond lens was soldered onto a molybdenum holder with a conically shaped hole using a eutectic alloy of copper, silver, and titanium. This pen was then mounted in a tang used for polishing diamond anvils and 8-sided pavilion facets were polished onto the diamond lens at an angle of 85° with the normal to the flat surface. A central, octagonally shaped area was left untouched, so that the centre thickness was not changed from the thickness to which it was polished in the previous step. Finally, the diamond SIL was removed from the molybdenum holder by dissolving the molybdenum in a mixture of nitric and sulphuric acid in water and subsequently rinsed in demineralised water and dried.

Example 2

Hemispherical Synthetic CVD-Grown Single-Crystal Diamond SIL

A hemispherical SIL was made from CVD-grown synthetic single-crystal diamond. A CVD grown diamond, approximately 3×3×2.8 mm in size, was first sawn into plates of approx. 0.8 mm thick. One plate was then polished on one side and mounted onto a graphite carrier plate and placed on an XY translation stage in the focus of a pulsed Nd:YAG cutting laser. Pulse energy was 1.2 mJ in a 150 ns pulse with a pulse repetition rate of 4,000 pps. The XY-stage then executed a circular motion with diameter 1.4 mm so that a cylindrical disc was cut out of the plate with diameter 1.4 mm.

Subsequently the disc was cleaned to remove any laser residue and brazed on the polished side onto a molybdenum rod which was 30 mm long and 3 mm in diameter with a eutectic alloy of gold and tantalum. The rod had a tapered end such that at the tip where the diamond was soldered its diameter was 0.8 mm. Prior to brazing the diamond disc was placed on the tip of the molybdenum rod centred with respect to the symmetry axis of the molybdenum rod to within 0.1 mm.

Subsequently the rod was mounted in a high-speed rotational spindle and this spindle was placed on an XY-translation stage near the focus of the Nd:YAG cutting laser with its axis perpendicular to the incoming light beam. Pulse energy was 1.2 mJ in a 150 ns pulse with a pulse repetition rate of 4,000 pps. The spindle rotated at 550 rpm. The XY-stage executed a motion corresponding to slightly more than a quarter circle in a bi-directional movement in a plane perpendicular to the incoming focused laser beam at a linear speed of 5 mm/min. Slight corrections to the circular motion were applied when cutting close to the axis of rotation, otherwise a slightly flattened surface would be cut out due to the low speed of rotational motion close to the rotation axis. Thus a hemispherical surface with a radius of 0.52 mm was cut out of the disc with deviations from an ideal spherical surface of less than 7 µm. RMS surface roughness ($R_q$) was approximately 2 µm.

The diamond hemisphere on its molybdenum rod was then mounted on a rotary stage, which rotated at 20 rpm. A resin-bond cup mounted on a high-speed rotary spindle, which ran at 20,000 rpm, was pressed against it with a force of 4 N. The resin-bond cup was made out of a disc of diamond-filled resin material with mean diamond particle size between 20 and 40 µm, in which a central hole of 400 µm in diameter was made. The disc was pressed against the pre-cut diamond sphere, and during the polishing process the disc obtained a spherical shape, matching the radius of the diamond sphere. The high-speed spindle was mounted on a rotary arm, which could rotate around an axis of rotation that intersected the symmetry axis of the diamond sphere on the molybdenum rod at the centre of curvature of the diamond sphere. At this stage, this arm was not moving but kept still at a fixed position and care was taken to adjust the angle of the arm such that the resin-bond disc made contact over an area that covered the apex of the diamond hemisphere up till the edge of the hemispherical surface. In this manner a hemispherical diamond surface was polished with deviations from an ideal spherical surface smaller than 2 µm. RMS surface roughness was less than 1.5 nm.

Subsequently the resin-bond cup was replaced by a disc of PCD Syndite® with a 2 µm mean diamond particle size. The disc had a central hole of 600 µm and was mounted in a carrier that mounted in the high-speed rotary spindle. The PCD disc was pressed against the diamond hemisphere with a force of 3 N. The spindle rotated initially at 12,000 rpm, and this was reduced to 6,000 rpm after 3 hours. The arm on which the spindle was mounted was set to rotate over approximately 50° in a bidirectional motion. After a further 4 hours of polishing a hemispherical surface was obtained with a radius of curvature of 0.50 mm and a maximum deviation from the ideal spherical surface of less than 70 nm. The RMS deviation as measured over the surface of the hemispherical surface from the ideal spherical surface was less than 12 nm.

The diamond was then removed from the molybdenum rod by heating the assembly above the melting temperature of the solder with which the diamond was mounted and, after rinsing in demineralised water and drying, was mounted in a sub-hemispherical cup made into the form of a 'brass pen' with a vacuum holding the diamond in place. Subsequently the pen with the diamond was mounted in a polishing arm and was pressed onto a resin-bond polishing scaife with 20-40 µm average particle size, rotating with a linear speed of 5 m/s. The force with which the diamond was pressed against the resin-bond scaife was kept constant at 2 N. Initially, when the diamond lens was more than 200 µm thicker than the desired thickness, polishing was done rapidly. When the thickness of the diamond lens was approximately 3 µm above the target thickness, diamond was polished off in steps of approximately 0.2 µm. For this diamond hemispherical SIL the radius of curvature was measured as 502.1 µm and the target thickness was 706.4 µm. Final thickness was to within 0.5 µm of the target thickness Example 3

Biconvex Natural IIa Type Single-Crystal Diamond Lens of Which One Surface has a Hemispherical Shape A hemispherical diamond surface was made from natural type IIa single-crystal diamond. A type IIa diamond, approximately 4 ct in size, was first sawn into plates of approx. 0.95 mm thick. One plate was then polished on one side and mounted onto a graphite carrier plate and placed on an XY translation stage in the focus of a pulsed Nd:YAG cutting laser. Pulse energy was 1.2 mJ in a 150 ns pulse with a pulse repetition rate of 4,000 pps. The XY-stage then executed a circular motion with diameter 1.6 mm so that a cylindrical disc was cut out of the plate with diameter 1.6 mm.

Subsequently the disc was cleaned to remove any laser residue and brazed with the polished side onto a molybdenum rod which was 30 mm long and 3 mm in diameter with a eutectic alloy of gold and tantalum. The rod had a tapered end such that at the tip where the diamond was soldered its diameter was 1.2 mm. Prior to brazing, the diamond disc was placed on the tip of the molybdenum rod centred with respect to the symmetry axis of the molybdenum rod to within 0.1 mm.

Subsequently the rod was mounted in a high-speed rotational spindle and this spindle was placed on an XY-translation stage near the focus of the Nd:YAG cutting laser with its axis perpendicular to the incoming light beam. Pulse energy was 1.2 mJ in a 150 ns pulse with a pulse repetition rate of 4000 pps. The spindle rotated at 600 rpm. The XY-stage executed a motion corresponding to slightly more than a quarter circle in a bi-directional movement in a plane perpendicular to the incoming focused laser beam at a linear speed of 6 mm/min. Thus a hemispherical surface with a radius of 0.72 mm was cut out of the disc with deviations from an ideal spherical surface of less than 10 µm. RMS surface roughness ($R_q$) was approximately 3 µm.

The diamond hemisphere on its molybdenum rod was then mounted on a rotary stage, which rotated at 10 rpm. A resin-bond cup mounted on a high-speed rotary spindle, which ran at 20,000 rpm, was pressed against it with a force of 6 N. The resin-bond cup was made out of a disc of diamond-filled resin material with mean diamond particle size between 20 and 40 µm, in which a central hole of 600 µm in diameter was made. The disc was pressed against the pre-cut diamond sphere and during the polishing process the disc obtained a spherical shape, matching the radius of the diamond sphere. The high-speed spindle was mounted on a rotary arm, which could rotate around an axis of rotation that intersected the symmetry axis of the diamond sphere on the molybdenum rod at the centre of curvature of the diamond sphere. This arm was not moving but kept still at a fixed position and care was taken to adjust the angle of the arm such that the resin-bond disc made contact over an area that covered the apex of the diamond hemisphere up till the edge of the hemispherical surface. In this manner a hemispherical diamond surface was polished with deviations from an ideal spherical surface smaller than 2 µm. RMS surface roughness was less than 1.5 nm.

Subsequently the diamond was removed from the molybdenum rod by heating the assembly above the melting temperature of the solder with which the diamond was mounted and after rinsing in demineralised water and drying, it was epoxied into a sub-hemispherical cup with an appropriate radius matching the radius of the diamond hemispherical surface, made into the form of an 'aluminium pen'. Two-component resin-type epoxy was used with a curing time of approximately 2 hrs. Before curing, care was taken that the normal to the polished flat surface coincided with the rotational symmetry axis of the brass pen.

After this the pen and diamond were mounted in a high-speed rotational spindle and this spindle was placed on an XY-translation stage near the focus of the Nd:YAG cutting laser with its axis perpendicular to the incoming light beam. Pulse energy was 1.2 mJ in a 150 ns pulse with a pulse repetition rate of 4000 pps. The spindle rotated at 500 rpm. The XY-stage executed a motion corresponding to slightly more than an arc of a circle, subtending approx. 10°, in a bi-directional movement in a plane perpendicular to the incoming focused laser beam at a linear speed of 5 mm/min. Slight corrections to the circular motion were applied when cutting close to the axis of rotation, otherwise a slightly flattened surface would be cut out due to the low speed of rotational motion close to the rotation axis. Thus a spherical surface with a radius of 13.2 mm was cut out of the disc with deviations from an ideal spherical surface of less than 5 μm. RMS surface roughness ($R_q$) was approximately 1.5 μm Subsequently the aluminium pen with the diamond was mounted on a rotary stage, which rotated at 6 rpm. A resin-bond cup mounted on a high-speed rotary spindle, which ran at 20000 rpm, was pressed against it with a force of 6 N. The resin-bond cup was made out of a disc of diamond-filled resin material with mean diamond particle size between 20 and 40 μm, in which a central hole of 600 μm in diameter was laser cut. The disc was pressed against the pre-cut diamond sphere and during the polishing process the disc obtained a spherical shape, matching the radius of the diamond sphere. The high-speed spindle was mounted on a rotary arm, which could rotate around an axis of rotation that intersected the symmetry axis of the diamond sphere on the molybdenum rod at the centre of curvature of the diamond sphere. This arm was not moving but kept still at a fixed position and care was taken to adjust the angle of the arm such that the resin-bond disc made contact over an area that covered the apex of the diamond hemisphere up till the edge of the hemispherical surface. In this manner a hemispherical diamond surface was polished with deviations from an ideal spherical surface smaller than 2 μm. RMS surface roughness was less than 1.5 nm. The lens was then dismounted from the aluminium pen by heating it above 250° C. until the epoxy had softened and the diamond could be removed. It was subsequently chemically cleaned to remove traces of epoxy.

This lens when illuminated at normal incidence by a parallel beam of light at 632 nm showed spherical aberration in conformance with the values expected for an ideal lens with identical nominal shape. Therefore the performance of the lens was close to ideal.

Example 4

Synthetic CVD-Grown Single-Crystal Diamond Metrology Tip Mounted on Tungsten Carbide Rod A sub-hemispherical SIL was made from CVD-grown synthetic single-crystal diamond. From a CVD grown diamond, approximately 4.5×4.5×3 mm in size, a plate of approx. 1.7 mm thick was first sawn. The plate was then polished flat on one side and mounted onto a graphite carrier plate and placed on an XY translation stage in the focus of a pulsed Nd:YAG cutting laser. Pulse energy was 1.2 mJ in a 150 ns pulse with a pulse repetition rate of 4000 pps. The XY-stage then executed a circular motion with diameter 3.3 mm so that a cylindrical disc was cut out of the plate with diameter 3.3 mm.

Subsequently the disc was cleaned to remove any laser residue and brazed with the polished side onto a tungsten carbide rod which was 50 mm long and 5 mm in diameter with a eutectic alloy of gold and germanium. The rod had a tapered end such that at the tip where the diamond was soldered its diameter was 2.7 mm. Prior to brazing, the diamond disc was placed on the tip of the tungsten carbide rod centred with respect to the symmetry axis of the tungsten carbide rod to within 0.1 mm.

Subsequently the tungsten carbide rod was mounted in a high-speed rotational spindle and this spindle was placed on an XY-translation stage near the focus of the Nd:YAG cutting laser with its axis perpendicular to the incoming light beam. Pulse energy was 1.2 mJ in a 150 ns pulse with a pulse repetition rate of 4000 pps. The spindle rotated at 300 rpm. The XY-stage executed a circular motion over approximately 3/16 the circumference of a circle in a bi-directional movement in a plane perpendicular to the incoming focused laser beam at a linear speed of 5 mm/min. Slight corrections to the circular motion were applied when cutting close to the axis of rotation, otherwise a slightly flattened surface would be cut out due to the low speed of rotational motion close to the rotation axis. Thus a sub-hemispherical surface with a radius of 1.52 mm was cut out of the disc with deviations from an ideal spherical surface of less than 5 μm. RMS surface roughness ($R_q$) was approximately 1.4 μm The diamond sub-hemisphere on its tungsten carbide rod was then mounted on a rotary stage, which rotated at 10 rpm. A resin-bond cup mounted on a high-speed rotary spindle, which ran at 15000 rpm, was pressed against it with a force of 6 N. The resin-bond cup was made out of a disc of diamond-filled resin material with mean diamond particle size between 20 and 40 μm, in which a central hole of about 1200 μm in diameter was made. The disc was pressed against the pre-cut diamond sphere and during the polishing process the disc obtained a spherical shape, matching the radius of the diamond sphere. The high-speed spindle was mounted on a rotary arm, which could rotate around an axis of rotation that intersected the symmetry axis of the diamond sphere on the molybdenum rod at the centre of curvature of the diamond sphere. At this stage this arm was not moving but kept still at a fixed position and care was taken to adjust the angle of the arm such that the resin-bond disc made contact over an area that covered the apex of the diamond sub-hemisphere up till the edge of the sub-hemispherical surface. In this manner a sub-hemispherical diamond surface was polished with deviations from an ideal spherical surface smaller than 2 μm. RMS surface roughness was less than 1.5 nm.

Subsequently the resin-bond cup was replaced by a disc of PCD Syndite® with a 2 μm mean diamond particle size. The disc had a central hole of 1200 μm and was mounted in a carrier that was mounted in the high-speed rotary spindle. The PCD disc was pressed against the diamond sub-hemisphere with a force of 6 N. The spindle was rotating first at 10000 rpm and after 4 hours this was reduced to 4000 rpm. The arm on which the spindle was mounted was set to rotate over approximately 50° in a bidirectional motion. After a further 10 hours of polishing a sub-hemispherical surface was obtained with a radius of curvature of 1.5 mm and a maximum deviation from the ideal spherical surface of less than 100 nm. The RMS deviation as measured over the surface of the sub-hemispherical surface from the ideal spherical surface was equal to 9.1 nm.

This diamond metrology tip was not removed from the tungsten-carbide rod it was mounted on since the rod could be used as the mount for the tip when used for measurement of surface shape and roughness. The conical half-angle subtended by the diamond spherical surface from its centre of curvature was approximately 60°.

It will be appreciated that variations from the above described embodiments may still fall within the scope of the invention.

The invention claimed is:

1. An element of single crystal diamond material comprising a convex surface formed thereon, the convex surface comprising a root mean square roughness of less than about 30 nm, and comprising a spherical segment comprising a conical half-angle greater than about 40°, the element further comprising at least one of the properties from the following list:
   the maximum peak to valley deviation from a perfect spherical surface of the spherical segment is less than about 5 µm; and
   the RMS deviation of the spherical segment, as measured by averaging over the square of deviations over the spherical segment, is less than or equal to about 500 nm.

2. The element of claim 1, wherein the convex surface has a radius of curvature less than about 20 mm.

3. The element of claim 1, wherein the element is formed substantially in the shape of a sphere.

4. The element of claim 1, further comprising a flat surface on a side of the element opposite to the convex surface.

5. The element of claim 4, wherein the flat surface has a surface roughness at least as low as the convex surface.

6. The element of claim 4, further comprising a tapered section between the convex surface and the flat surface.

7. The element of claim 6, wherein the tapered section comprises a plurality of polished facets.

8. The element of claim 4; wherein the element has a thickness in a direction substantially normal to the flat surface correct to within at least 2 µm of an ideal thickness.

9. The element of claim 8, wherein the element has a generally hemispherical shape with an ideal thickness equal to the radius of curvature of the hemisphere.

10. The element of claim 8, wherein the element has a generally super-hemispherical shape and an ideal thickness defined by $t = r(1+1/n)$, where t is the thickness of the element in a direction substantially normal to the flat surface, r is the radius of curvature of the super-hemisphere, and n is the refractive index of the diamond material from which the element is formed.

11. The element of claim 1, wherein the single crystal diamond material is natural diamond.

12. The element of claim 1, wherein the single crystal diamond material is synthetic diamond.

13. The element of claim 12, wherein the synthetic diamond material is formed by High Pressure and High Temperature synthesis.

14. The element of claim 12, wherein the single crystal diamond material is CVD diamond.

15. A single crystal diamond lens comprising a diamond element as claimed in claim 1.

16. A single crystal diamond solid immersion lens comprising a diamond element as claimed in claim 1.

17. An optical information recording and/or reproducing apparatus comprising:
   a recording medium;
   a laser light source; and
   a converging lens unit including a solid immersion lens as claimed in claim 16 disposed adjacent the recording medium.

18. An optical pickup device comprising:
   a recording medium;
   a laser light source; and
   a converging lens unit including a solid immersion lens as claimed in claim 16 disposed adjacent the recording medium.

19. A tool tip for use in a metrology apparatus comprising a diamond element as claimed in claim 1.

20. A reference sphere for use in measuring hole diameters comprising a single crystal diamond element as claimed in claim 1.

21. A reference sphere for use in calibrating measurement instruments comprising a single crystal diamond element as claimed in claim 1.

22. A reference sphere for use as a reference spacer or as a spacer for defining a surface comprising a single crystal diamond element as claimed in claim 1.

* * * * *

UNITED STATES PATENT AND TRADEMARK OFFICE
CERTIFICATE OF CORRECTION

PATENT NO.         : 8,309,205 B2
APPLICATION NO.    : 11/995067
DATED              : November 13, 2012
INVENTOR(S)        : Wilhelmus Gerarda Maria Nelissen et al.

Page 1 of 1

It is certified that error appears in the above-identified patent and that said Letters Patent is hereby corrected as shown below:

On the title page, Item (75), the eighth inventor's name is incorrect. Item (75) should read:

--(75) Inventors: Wilhelmus Gerarda Maria Nelissen, Venray (NL); Herman Philip Godfried, Amsterdam (NL); Evert Pieter Houwman, Linden (NL); Paulus Adrianus Cornelis Kriele, Mill (NL); Johannes Cornelis Lamers, Duiven (NL); Gerrit Jan Pels, Arnhem (NL); Bartholomeus Mathias Van Oerle, Nijmegen (NL); Paulus Gerardus Hendricus Maria Spaay, Wijchen (NL); Mark Robin McClymont, Wokingham (GB); Christopher John Howard Wort, Wantage (GB); Geoffrey Alan Scarsbrook, Ascot (GB)--

Signed and Sealed this
Twelfth Day of February, 2013

Teresa Stanek Rea
*Acting Director of the United States Patent and Trademark Office*